United States Patent
Kang et al.

(10) Patent No.: US 6,925,244 B1
(45) Date of Patent: Aug. 2, 2005

(54) APPARATUS FOR RECORDING/REPRODUCING HIGH RESOLUTION VIDEO SIGNAL

(75) Inventors: Yong-Jin Kang, Suwon (KR); Chul-Min Kim, Suwon (KR)

(73) Assignee: Samsung Electronics Co., LTD, Suwon-si (KR)

( * ) Notice: Subject to any disclaimer, the term of this patent is extended or adjusted under 35 U.S.C. 154(b) by 948 days.

(21) Appl. No.: 09/605,424

(22) Filed: Jun. 28, 2000

(30) Foreign Application Priority Data

Jun. 28, 1999 (KR) ........................................ 1999 24752

(51) Int. Cl.⁷ ........................... H04N 9/79; H04N 11/00
(52) U.S. Cl. .......................................... 386/21; 386/37
(58) Field of Search .............................. 386/21, 17, 22, 386/24, 31, 34, 44, 46, 37, 35, 40, 113, 114, 115, 123, 124, 26, 1; H04N 9/79, 11/00

(56) References Cited

U.S. PATENT DOCUMENTS

| | | | |
|---|---|---|---|
| 4,805,035 A | | 2/1989 | Kawakami et al. |
| 4,811,116 A | | 3/1989 | Baumeister |
| 5,121,266 A | | 6/1992 | Ito et al. |
| 5,159,460 A | | 10/1992 | Senso |
| 5,245,439 A | * | 9/1993 | Kim ............................. 386/26 |
| 5,305,112 A | | 4/1994 | Yamamoto et al. |
| 5,606,423 A | | 2/1997 | Wedam |
| 5,659,358 A | | 8/1997 | Hieda ......................... 348/255 |
| 5,751,884 A | | 5/1998 | Ko |
| 5,966,494 A | | 10/1999 | Iwamoto |

FOREIGN PATENT DOCUMENTS

| | | |
|---|---|---|
| DE | 4303469 | 2/1993 |
| EP | 0 621 732 A2 | 10/1994 |
| EP | 0 921 691 A2 | 9/1999 |
| GB | 2 243 513 A | 10/1991 |
| GB | 2 243 513 | 10/1991 |
| GB | 2 249 912 A | 5/1992 |
| GB | 2 251 759 A | 7/1992 |
| JP | 5-325112 | 12/1993 |

OTHER PUBLICATIONS

British Patent Office Search Report dated Jan. 21, 2001.
Korean Patent Office Action dated Apr. 30, 2001.
UK Search Report GB 0015740.4 issued on Jan. 16, 2002.

* cited by examiner

*Primary Examiner*—Robert Chevalier
(74) *Attorney, Agent, or Firm*—Robert E. Bushnell, Esq.

(57) ABSTRACT

A video signal recording/reproducing apparatus for recording/reproducing a high resolution video signal wherein the video resolution is enhanced by shifting a carrier frequency to a higher band in frequency modulation in a VCR's video signal recording mode, and by differently setting the frequency characteristics depending on the presence of a color signal in the video signal. The video signal recording/reproducing apparatus results in a highly enhanced resolution of a recording/reproducing video signal by determining use of a color signal trap in an equalizing block and a filter frequency for separating a luminance signal depending on the presence of a color signal in recording/reproducing a video signal after determining whether the color signal is present. Also, the video signal recording/reproducing apparatus results in a highly improved resolution of a recording/reproducing video signal by shifting an FM modulation carrier frequency to a higher band and by shifting a peaking frequency in an equalizing block to a higher band.

43 Claims, 5 Drawing Sheets

APPARATUS FOR RECORDING/REPRODUCING HIGH RESOLUTION VIDEO SIGNAL

CLAIM OF PRIORITY

This application makes reference to, incorporates the same herein, and claims all benefits accruing under 35 U.S.C. § 119 from an application entitled Apparatus for Recording/Reproducing a Video Signal with High Resolution earlier filed in the Korean Industrial Property Office on the 28 day of Jun. 1999, and there duly assigned Serial No. 99-24752, a copy of which is annexed hereto.

BACKGROUND OF THE INVENTION

1. Technical Field

The present invention relates to an apparatus for recording and reproducing a high resolution video signal.

2. Related Art

The recording process pertaining to recording a video signal onto a magnetic tape consists of applying a temporarily changing signal voltage to a record head as the magnetic tape is conveyed past the record head.

The basic steps involved in recording video signals onto the magnetic video tape include transporting the magnetic tape at a regulated speed, and causing the magnetic coating of the tape to contact an erase head which demagnetizes the tape coating. The tape then moves into contact with the record head. The record head has a magnetic field varying in accordance with the magnitude of a current signal. With low-level signals the field will be small, and some magnetic particles in the tape coating will be forced into alignment with the field. As the signal field is increased, a larger number of particles will become oriented in the direction of the recording field. As the magnetic tape is moved past the record gap, the magnetic coating can acquire a surface magnetization having a magnitude and a direction.

I have found that there is a need for an improved device which can efficiently and conveniently record a high resolution video signal and reproduce that signal. Efforts have been made in the area of recording video signals.

Exemplars of recent efforts in the art include U.S. Pat. No. 5,751,884 for High-Resolution Video Tape Recorder Systems and Methods for Recording and Recovering Video Compatibly with the Normal-VHS Format System issued to Ko, U.S. Pat. No. 5,966,494 for Apparatus And Method for Recording and Reproducing A Video Signal to And from A Record Medium issued to Iwamoto, U.S. Pat. No. 5,159,460 for Video Signal Recording Apparatus That Converts High Definition Video Signals into Signals Usable with Conventional Television Systems issued to Senso, U.S. Pat. No. 5,606,423 for Compatible High-Resolution Video Recording Format issued to Wedam, U.S. Pat. No. 5,305,112 for Video Signal Recording/Reproducing. System for Recording And Reproducing Video Signals in High Quality Picture Television System issued to Yamamoto et al., U.S. Pat. No. 4,805,035 for Color Video And Audio Recording And/Or Reproducing Apparatus issued to Kawakami et al., and U.S. Pat. No. 4,811,116 for Video Recorder Using Extended Tape Tracks to Record Compressed Chrominance issued to Baumeister.

While these recent efforts provide advantages, I note that they fail to adequately provide an improved device which can efficiently and conveniently record and reproduce high resolution video signals.

SUMMARY OF THE INVENTION

In order to solve the above problems, an objective of the present invention is to provide an apparatus for recording/reproducing a high resolution video signal by changing the characteristics of a filter and a carrier frequency in frequency modulation (FM) in accordance with the presence or absence of a color signal in a video signal to record.

Accordingly, to achieve the above objective and others, there is provided an apparatus for recording a high resolution video signal having a color killer decision unit for generating a color killer control signal when the unit determines an absence of a color signal after determining whether a normal color signal is present in the video signal; a low pass filter unit for receiving the video signal and then passing only a low frequency band signal lower than a cut off frequency by setting the cut off frequency higher than at least a color signal sub-carrier frequency if the color killer control signal is generated, and otherwise by setting the cut off frequency lower than a color signal sub-carrier frequency; an FM modulation unit for frequency-modulating an output signal of the low pass filter unit; and a recording equalizing unit for receiving the FM-modulated signal, and then peaking a predetermined luminance signal frequency band cutting off the frequency down-converted color signal frequency band if the color killer control signal is not generated, and not cutting off the frequency down-converted color signal frequency band if the color killer control signal is generated.

To achieve the above objects and others, there is provided another apparatus for recording a high resolution video signal having a key input unit for selecting between a high resolution recording mode and a normal recording mode; a low-pass filter for separating a luminance signal from the video signal; an FM modulation unit for receiving the separated luminance signal from the low-pass filter, and modulating the signal frequency by setting a frequency deviation of 3.4 MHZ~4.4 MHz for a National Television Standards Committee (NTSC) signal and a frequency deviation of 3.8 MHZ~4.8 MHz for a phase alternation line (PAL) signal or sequential couleur avec memoire (SECAM) signal in a normal recording mode, and by setting a frequency deviation of $3.4+\alpha$ MHz~$4.4+\alpha$ MHz for an NTSC signal and $3.8+\alpha$ MHz~$4.8+\alpha$ MHz for a PAL or SECAM signal, in which a is a positive number, in a high resolution mode; a recording equalizing unit for receiving the FM-modulated signal from the FM modulation unit, and setting a peaking frequency higher in the high resolution recording mode than a peaking frequency of the normal recording mode to compensate for the frequency characteristics of the luminance signal.

To achieve the above objects and others, there is provided an apparatus for reproducing a high resolution video signal having a key input unit for selecting between a high resolution reproducing mode and a normal reproducing mode corresponding to a recording mode; a pre-amplifier for amplifying a video signal detected by a video head; a color killer decision unit for generating a color killer control signal when the unit decides the absence of a color signal after determining whether a color signal is present in the video signal output from the pre-amplifier; a reproducing equalizing unit for receiving the video signal output from the pre-amplifier, and then peaking a predetermined frequency signal cutting-off a frequency down-converted color signal frequency band if the color killer control signal is not generated, and not cutting-off a frequency down-converted color signal frequency band if the color killer control signal is generated; a demodulation unit for receiving the input signal from the reproducing equalizing unit, and then frequency-demodulating the input signal to a carrier-wave frequency corresponding to the high resolution or normal reproducing mode; and a low-pass filter unit for receiving the FM-demodulated signal from the demodulation unit, and passing a low band frequency signal lower than a cut-off frequency by setting the cut-off frequency higher than at least a color signal sub-carrier frequency if the color killer control signal is generated, and otherwise by setting the cut-off frequency lower than a color signal sub-carrier frequency.

To achieve these and other objects in accordance with the principles of the present invention, as embodied and broadly described, the present invention provides an apparatus, comprising: a decision unit detecting when a video signal includes a color signal, detecting when said color signal has predetermined characteristics, generating a color killer control signal when said video signal does not include said color signal; a low pass filter unit receiving said video signal, outputting a low frequency band signal, said low frequency band signal being lower than a first cut off frequency by setting said first cut off frequency higher than at least a color signal sub-carrier frequency when said color killer control signal is generated, said low frequency band signal being lower than a second cut off frequency by setting said second cut off frequency lower than a color signal sub-carrier frequency when said color killer control signal is not generated; a frequency modulation unit frequency-modulating said band signal output from said low pass filter unit; and a recording equalizing unit receiving said frequency modulated signal, peaking a predetermined luminance signal frequency band cutting off the frequency down-converted color signal frequency band when said color killer control signal is not generated, and not cutting off the frequency down-converted color signal frequency band when said color killer control signal is generated.

To achieve these and other objects in accordance with the principles of the present invention, as embodied and broadly described, the present invention provides an apparatus, comprising: a key input unit selecting one mode from among a high resolution recording mode and a normal recording mode; a low pass filter separating a luminance signal from a video signal; a frequency modulation unit receiving said separated luminance signal from said low pass filter, modulating signal frequency by setting a first frequency deviation when said normal recording mode is selected, modulating signal frequency by setting a second frequency deviation when said high resolution recording mode is selected; a recording equalizing unit receiving said frequency modulated signal from said frequency modulation unit, setting a first peaking frequency when said high resolution recording mode is selected, setting a second peaking frequency when said normal recording mode is selected, said first peaking frequency being higher than said second peaking frequency.

To achieve these and other objects in accordance with the principles of the present invention, as embodied and broadly described, the present invention provides an apparatus, comprising: a key input unit selecting one reproducing mode from among a high resolution reproducing mode and a normal reproducing mode, said selected reproducing mode corresponding to a recording mode; a pre-amplifier amplifying a video signal; a color killer decision unit generating a color killer control signal when no color signal is present in said video signal output from said pre-amplifier; a reproducing equalizing unit receiving said video signal output from said pre-amplifier, peaking a predetermined frequency signal cutting-off a frequency down-converted color signal frequency band when said color killer control signal is not generated, and not cutting-off a frequency down-converted color signal frequency band when said color killer control signal is generated; a demodulation unit receiving a first signal output from said reproducing equalizing unit, frequency-demodulating said first signal to a carrier-wave frequency corresponding to said selected reproducing mode; and a low-pass filter unit receiving said frequency modulated-demodulated signal from said demodulation unit, passing a low band frequency signal lower than a first cut-off frequency by setting said first cut-off frequency higher than at least a color signal sub-carrier frequency when said color killer control signal is generated, passing a low band frequency signal lower than a second cut-off frequency by setting said second cut-off frequency lower than a color signal sub-carrier frequency when said color killer control signal is not generated.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
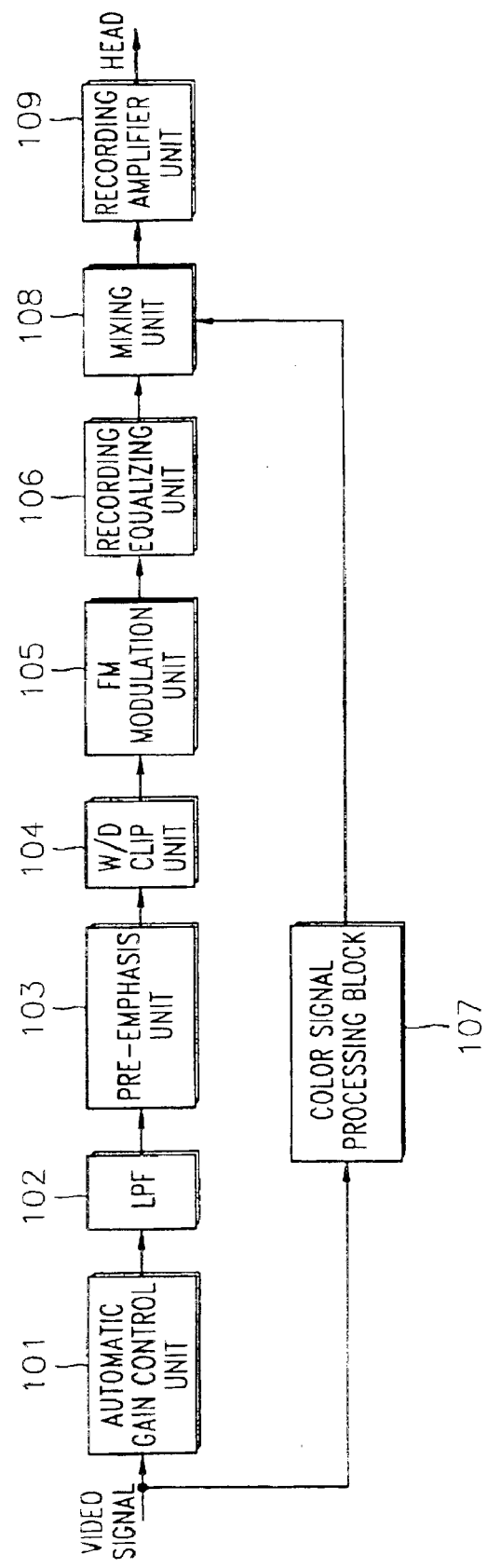
FIG. 1 is a block diagram showing a luminance signal recorder.

As illustrated in FIG. 1, a recorder for recording a luminance signal includes an automatic gain control unit 101, a low-pass filter 102, a pre-emphasis unit 103, a white/dark clip unit 104, a frequency modulation (FM) unit 105, a recording equalizing unit 106, a color signal processing block 107, a mixing unit 108, and a recording amplifier 109.

The automatic gain control unit 101 controls the amplitude of an input video signal by controlling a gain value when there is a change in the amplitude, that is, when the size of a white peak (white 100%) is different. The color signal processing block 107 is a means for demodulating a modulated color signal and performing noise filtering.

Figure 6:
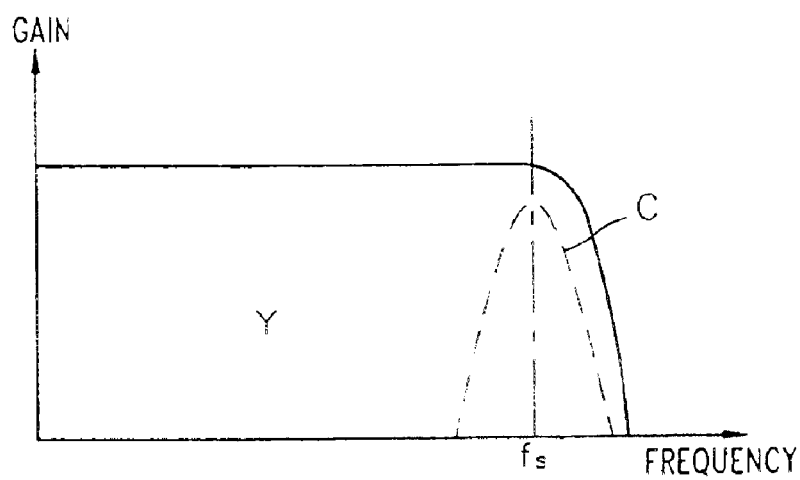
FIG. 6 illustrates frequency bands of a luminance signal and a color signal which compose a composite video signal, in accordance with the principles of the present invention.

The low-pass filter 102 passes only a low frequency band signal of a composite video signal, which includes a luminance signal (Y) and a color signal (C) as illustrated in FIG. 6, by setting a cut-off frequency of about 3 megahertz (Mhz). The pre-emphasis unit 103 boosts the high frequency band of an input signal in recording in order to prevent lowering of the signal-to-noise ratio due to a triangular noise which necessarily occurs in demodulation of a frequency-modulated signal. The white/dark clip unit 104 clips an input signal to a white level and a synchronization tip level in order to prevent overmoduation in overshoot and undershoot parts in frequency modulation.

The FM modulation unit 105 frequency-modulates the white/dark-clipped luminance signal with a frequency deviation of 3.4 MHz~4.4 MHz for a National Television Standards Committee (NTSC) signal. The National Television Standards Committee is the committee that established the standards for television video signals for the U.S.A. in the 1950s.

Figure 8:
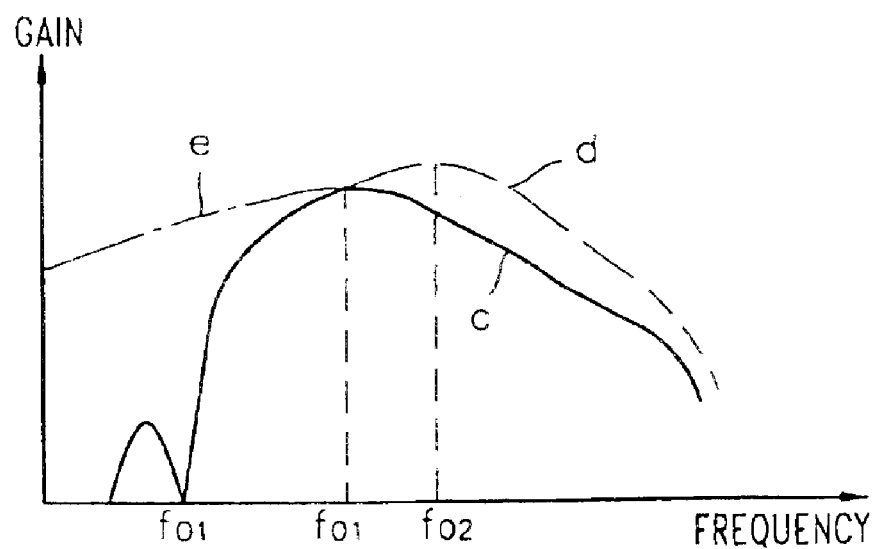
FIG. 8 illustrates the frequency characteristics of the recording equalizing block of FIG. 2, in accordance with the principles of the present invention.

The recording equalizing unit 106 cuts off a low frequency band, as shown by the graph of FIG. 8, to cut off a color signal frequency, and boosts the waveform in order to improve the recording frequency characteristics. The mixing unit 108 mixes the modulated luminance signal output from the recording equalizing unit 106 and the frequency down-converted color signal. The recording amplifier 109 amplifies electric power to a level appropriate for the recording characteristics of a recording medium to power a video head (not illustrated in the accompanying drawings).

As described above, a recorder for recording a luminance signal sets the same frequency characteristics in the low-pass filter unit 102 and the recording equalizing unit 106 regardless of the presence of a color video signal, thus causing a problem in that loss occurs in the luminance signal which is included in the color frequency signal band or in adjacent frequency bands in the case of a monochrome signal. Furthermore, when technologies fix the frequency deviation of the frequency modulation unit 105 to 3.4~4.4 MHz (NTSC), it is problematic in that a limitation is placed in enhancing resolution in reproducing a recorded signal.

Figure 2:
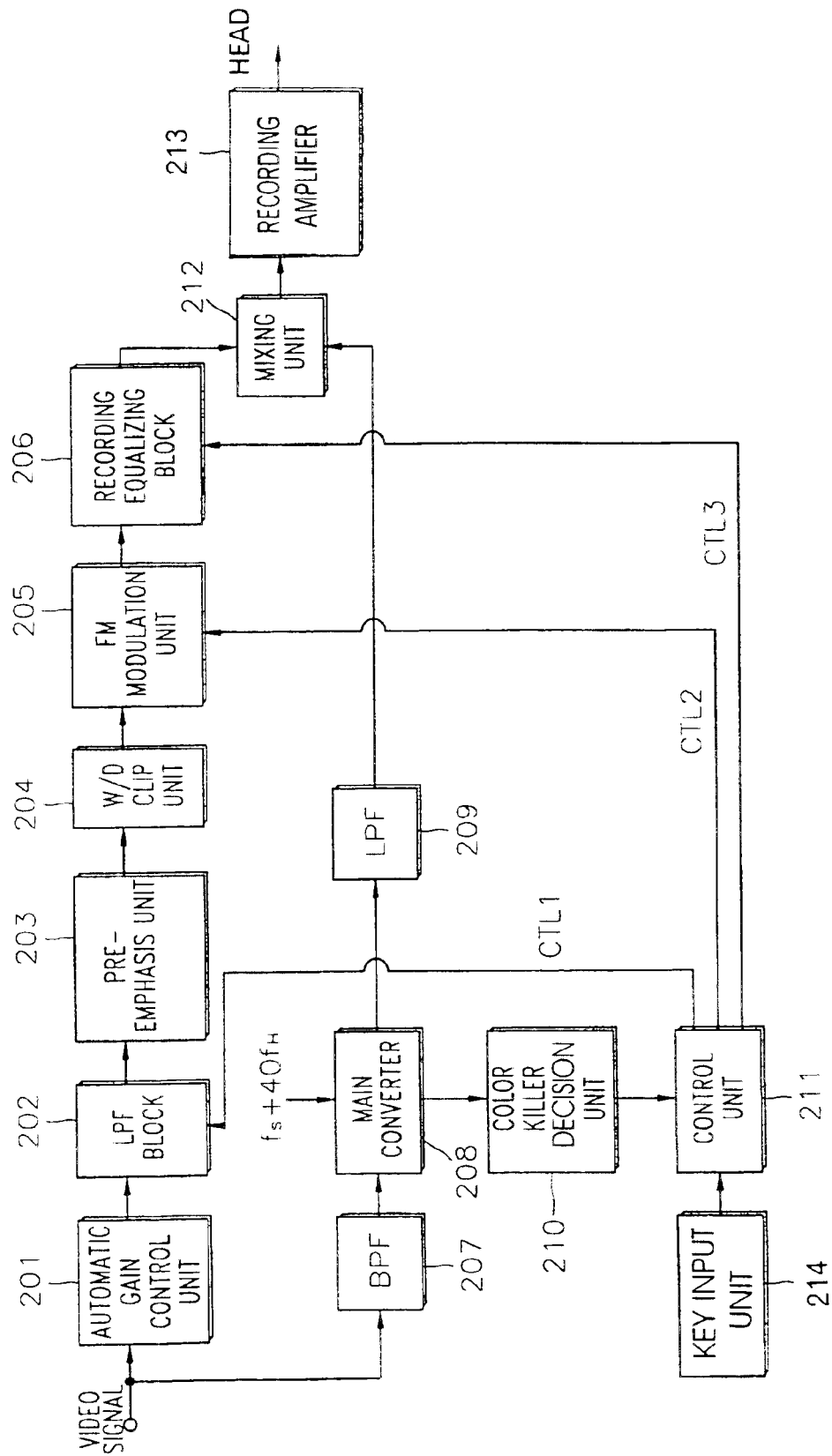
FIG. 2 is a block diagram showing a recorder of an apparatus for recording/reproducing a high resolution video signal, in accordance with the principles of the present invention.

The structure and operation of desirable examples of the present invention will now be described with reference to the accompanying drawings. As illustrated in FIG. 2, an apparatus for recording a video signal with high resolution according to the present invention includes an automatic gain control unit 201, a low pass filter block 202, a pre-emphasis unit 203, a white/dark clipping unit 204, an FM modulation unit 205, a recording equalizing block 206, a band pass filter 207, a main converter 208, a low pass filter 209, a color killer decision unit 210, a control unit 211, a mixing unit 212, a recording amplifier 213, and a key input unit 214.

Figure 4:
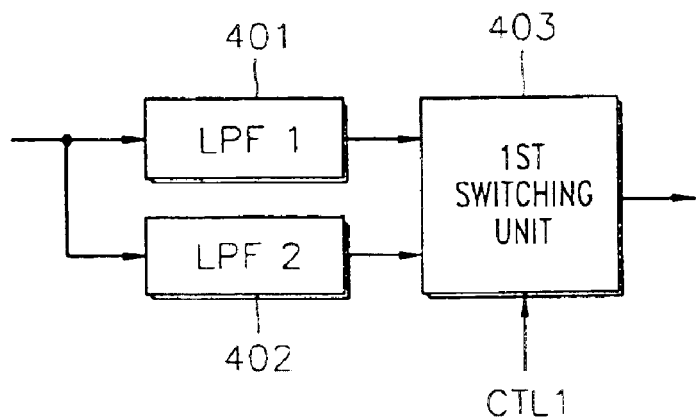
FIG. 4 is a more detailed block diagram of a low pass filter blocks of FIG. 2, in accordance with the principles of the present invention.
Figure 5:
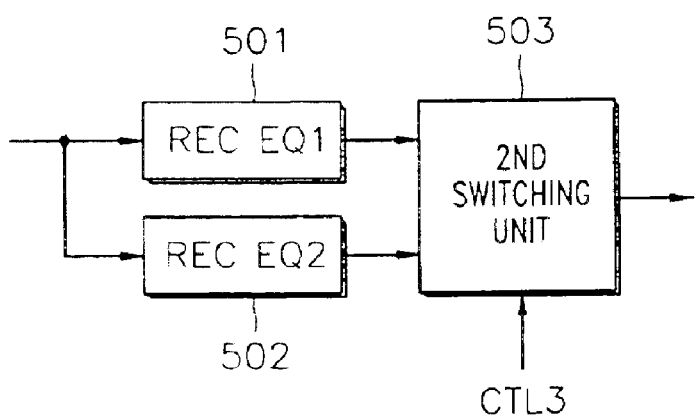
FIG. 5 is a more detailed block diagram of a recording equalizing block of FIG. 2, in accordance with the principles of the present invention.

As illustrated in FIG. 4, the low pass filter block 202 includes a first low pass filter (LPF 1) 401, a second low pass filter (LPF 2) 402, and a first switching unit 403. As illustrated in FIG. 5, the recording equalizing block 206 includes a first recording equalizing unit (REC EQ1) 501, a second recording equalizing unit (REC EQ2) 502, and a second switching unit 503.

The automatic gain control unit 201 detects amplitude changes in a video signal to record. When there is a change in the amplitude, that is, the size of a white peak (white 100%) is different, the automatic gain control unit 201 controls the amplitude of the video signal to record by controlling the gain value.

The band pass filter 207 receives a video signal with a frequency band as illustrated in FIG. 6, passes a chroma sub-carrier band ($f_s$) in which a color signal is present, and outputs only a separated color signal (C). The main converter 208 subtracts the color signal frequency of the chroma sub-carrier band ($f_s$) input from the band pass filter 207 from a signal frequency ($f_s+40_H$) to frequency down-convert the color signal into a 629 KHz low frequency band.

The low pass filter 209 passes only frequency down-converted signals among output signals from the main converter 208. The color killer decision unit 210 receives output signals from the band pass filter 207, and determines the presence of a color signal by detecting a color burst signal. That is, the color killer decision unit 210 determines that there is a monochrome video signal, in which a color signal is not present, when there is no color burst signal. Furthermore, when the phase is distorted or the noise level is high (even when there is a color burst signal), then the color killer decision unit 210 determines that the signal is an abnormal color signal, and that there is no normal color signal.

In the key input unit 214, a user selects a high resolution recording mode or a normal recording mode in video signal recording. The control unit 211 generates control signals (CTL1~3) to control each block in accordance with a selected recording mode input from the key input unit 214 and a color killer signal input from the color killer decision unit 210.

The low pass filter block 202, as illustrated in FIG. 4, includes two low pass filters and switching units. When a control signal (CTL1) approved from the control unit 211 indicates a color signal, the first low pass filter 401 passes only signal frequencies lower than a cut off frequency ($f_{C1}$), because the cut off frequency ($f_{C1}$) is set up at a lower frequency than the sub-carrier frequency of a color signal in order to pass input signals with the frequency characteristics of curve (a) in FIG. 7. Meanwhile, when a control signal (CTL1) indicates a monochrome signal, the second low pass filter 402 passes only signal frequencies lower than a cut off frequency ($f_{C2}$), because the cut off frequency ($f_{C2}$) is set up at a higher frequency than the sub-carrier frequency of a color signal in order to pass input signals with the frequency characteristics of curve (b) in FIG. 7. The first switching unit 403 receives the output signals from the first and second low pass filters 401 and 402, and selects and outputs the signal input from the first low pass filter 401 if the control signal indicates a color signal being included, while the first switching unit 403 selects and outputs the signal input from the second low pass filter 402 if the control signal indicates a monochrome signal. This is to reduce loss of a luminance signal when recording a monochrome signal with no color signal, because a luminance signal is also present, in the band where a color signal is present as illustrated in FIG. 6.

The pre-emphasis unit 203 boosts the high frequency band in recording in order to prevent lowering of the signal-to-noise ratio of a reproduced signal due to a triangular noise which necessarily occurs in demodulation of a frequency-modulated signal.

The white/dark clip unit 204 clips an input signal to a white level and a synchronization tip level in order to prevent overmodulation in overshoot and undershoot parts in FM modulation.

The FM modulation unit 205 sets a carrier frequency differently in line with the recording mode selected by a user through the key input unit 214. That is, for the normal recording mode, the FM modulation unit 205 sets a frequency deviation of 3.4 MHz~4.4 MHz for an NTSC signal, while the frequency deviation is 3.8 MHz~4.8 MHz for a PAL or SECAM signal. However, for the high resolution recording mode, the FM modulation unit 205 sets a carrier frequency higher than that of the normal recording mode in order to enhance the frequency characteristics. That is, the FM modulation unit 205 sets a frequency deviation of $3.4+\alpha$ MHz~$4.4+\alpha$ MHz (here, a is a positive number) for an NTSC signal, while a frequency deviation of $3.8+\alpha$ MHz~$4.8+\alpha$ MHz (here, a is a positive number) for a PAL or SECAM signal. The reason for raising the carrier frequency in the high resolution recording mode compared to the carrier frequency in the normal recording mode is that the frequency characteristics of a high frequency band portion is enhanced as the carrier frequency is increased. Also, increasing the carrier frequency enables reduction in the interference with a color signal of a low frequency band portion, because a low sideband in both sideband signals is selected to process in modulation in a VCR.

The recording equalizing block 206 boosts a luminance signal to compensate for attenuation in the high frequency band, and decides differently a frequency to peak in accordance with the recording mode.

The recording equalizing block 206, as illustrated in FIG. 5, includes the first recording equalizing block 501, the second recording equalizing block 502, and the second switching unit 503. The first recording equalizing block 501 boosts a luminance signal to a peaking frequency corresponding to the normal recording mode, as shown by the waveform (c) of FIG. 8. The second recording equalizing block 502 boosts a luminance signal to a peaking frequency corresponding to the high resolution recording mode, as shown by the waveform (d) of FIG. 8. Also, when the result of the determination by the color killer decision unit 210 indicates a monochrome signal in which a color signal component is not present in a video signal and the monochrome signal is being recorded, separation of a color component is not required. Thus, the second recording equalizing block 502 passes the chroma sub-carrier frequency band without using a trap, as shown by (e) of FIG. 8. This is to preserve some luminance component which is also present in the chroma sub-carrier band.

The mixing unit 212 mixes the modulated luminance signal output from the recording equalizing block 206 and the frequency down-converted color signal from the low pass filter 209. Then, the recording amplifier 213 receives the modulated video signal of the mixing unit 212, in which the luminance signal and the color signal are mixed, and generates a recording current appropriate for a recording medium to record the signal into the recording medium through a video head (not illustrated in the accompanying drawings).

Figure 3:
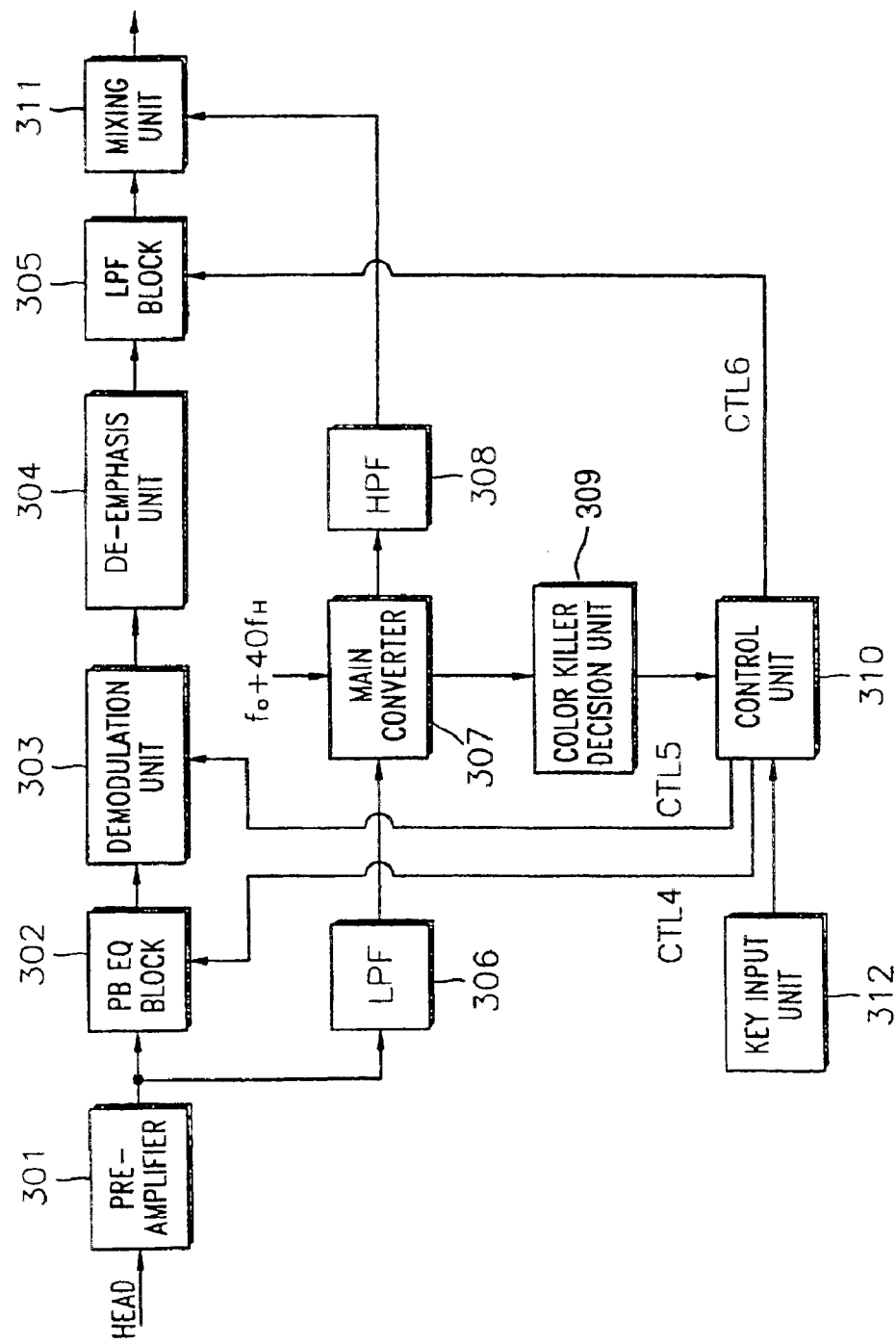
FIG. 3 is a block diagram showing a reproducer of an apparatus for recording/reproducing a high resolution video signal, in accordance with the principles of the present invention.

Next, the apparatus for reproducing a high resolution video signal according to the present invention will now be described. As illustrated in FIG. 3, the apparatus for reproducing a high resolution video signal according to the present invention includes a pre-amplifier unit 301, a playback (PB) reproducing equalizing (EQ) block 302, a demodulation block 303, a de-emphasis unit 304, a low pass filter block 305, a low pass filter 306, a main converter 307, a high-pass filter 308, a color killer decision unit 309, a control unit 310, a mixing unit 311 and a key input unit.

The pre-amplifier 301 amplifies a modulated video signal detected by a video head to a level that is requested by a signal processing block. The low pass filter 306 passes only a frequency band lower than the frequency down-converted color sub-carrier frequency in order to separate the frequency down-converted color signal included in the modulated video signal. The main converter 307 subtracts the frequency down-converted color signal frequency from a reference frequency ($f_0+40_H$) for output in order to convert the frequency down-converted color signal to the frequency band where the signal was present before the frequency down-conversion.

The high-pass filter 308 receives the output signal of the main converter 307 and passes only high frequency component, which includes the color sub-carrier frequency, in order to pass only the demodulated color signal. The color killer decision unit 309 determines the presence of a demodulated color signal in accordance with the presence of a color burst signal. In addition, when the phase is distorted more than a permissible range or the noise is too high even when a color burst signal is present, the color killer unit 309 determines the signal to be an abnormal color signal. That is, the color killer unit 309 decides that there is no color signal.

The control unit 310 generates a control signal (CTL4~6) to control each block corresponding to the reproducing mode selection input from the key input 312 and the color killer signal input from the color killer decision unit 309.

The reproducing equalizing block 302 boosts a luminance signal to compensate for attenuation in a high frequency band in reproducing, and sets a peaking frequency differently according to the reproducing mode.

Similarly to the method of the recording equalizing block 206 of the recording mode, the reproducing equalizing block 302, corresponding to the control signal (CTL4), boosts the luminance signal with a peaking frequency, as shown by curve (c) of FIG. 8 in a normal reproducing mode. The recording equalizing block 302 boosts the luminance signal with a higher frequency in the high resolution reproducing mode, as shown by curve (d) of FIG. 8, than that in the normal reproducing mode in order to compensate more for the high frequency band.

Also, when the result of the determination by the color killer decision unit 309 indicates a monochrome signal in which a color signal component is not present in a video signal and the monochrome signal is reproduced, separation of a color signal is not required. Thus, the reproducing equalizing block 302 passes a low frequency band signal without using a trap in the chroma sub-carrier frequency band, as illustrated by (e) of FIG. 8. This is to preserve some luminance component which is also present in the chroma sub-carrier band.

The demodulation unit 303 sets a carrier frequency differently than the control signal (CTL5) in accordance with a reproducing mode selected by a user through the key input unit 312. That is, the demodulation unit 303 sets a frequency deviation of 3.4 MHz~4.4 MHz for an NTSC signal, and a frequency deviation 3.8 MHz~4.8 MHz for a PAL or SECAM signal in the normal reproducing. However, for the high resolution reproducing mode, the demodulation unit 303 sets a frequency deviation corresponding to the carrier frequency set in recording. That is, just as in the high resolution recording mode, the demodulation unit 303 sets a frequency deviation of 3.4+α MHz~4.4+α MHz (here, a is a positive number) for an NTSC signal, while a frequency deviation of 3.8+α MHz~4.8+α MHz (here, a is a positive number) for a PAL or SECAM signal.

Figure 7:
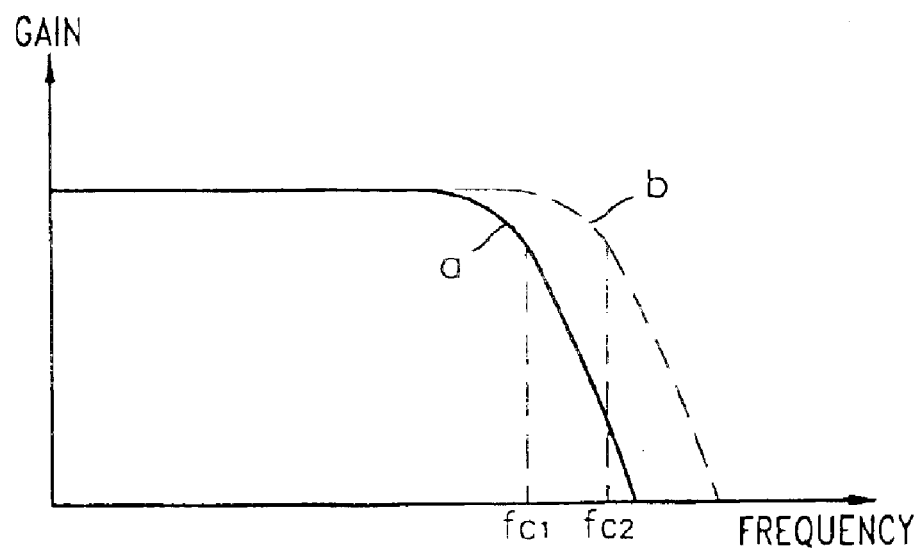
FIG. 7 illustrates the frequency characteristics of the low pass filter block of FIG. 2, in accordance with the principles of the present invention.

The de-emphasis unit 304 offsets the high frequency band emphasized in the emphasis unit 203 in recording. The low pass filter block 305 passes only a low band signal setting a cut off frequency lower than a sub-carrier frequency of a color signal in order to pass the input signal with the frequency characteristics as (a) of FIG. 7 when a control signal (CTL6) indicates a color signal. Meanwhile, the low pass filter block 305 passes only a low frequency band signal setting a cut off frequency higher than a sub-carrier frequency of a color signal in order to pass the input signal with the frequency characteristics as (b) of FIG. 7 when a control signal (CTL6) approved from the control unit 310 indicates a monochrome signal. This is to reduce loss of a luminance signal when to record monochrome signal with no color signal, because a luminance signal is also present in the frequency band where a color signal is present, as illustrated in FIG. 7.

The mixing unit 311 outputs a reproduced video signal by mixing the demodulated luminance signal output from the low pass filter block 305 and the demodulated color signal output from the high-pass filter 308.

With the operations described above, the apparatus minimizes loss of a luminance signal by switching a cut off frequency of a filter for separation of a color signal and a trap operation of the recording/reproducing equalizing blocks, and enables improvement of the frequency characteristics by shifting a carrier frequency to a higher band in FM modulation in the high resolution recording/reproducing mode.

As described above, the apparatus according to the present invention determines a filter frequency for separation of a luminance signal and whether to use a color signal trap in the equalizing block by determining the presence of a color signal in recording/reproducing a video signal. Also, the apparatus shifts the FM modulation carrier frequency to a higher band and a peaking frequency of the equalizing block to a higher band, thus enhancing the resolution of a recorded/reproduced video signal.

The foregoing paragraphs describe the details of a video signal recording/reproducing apparatus, and more particularly, to an apparatus for recording/reproducing a high resolution video signal wherein the video resolution is enhanced by shifting a carrier frequency to a high frequency band in frequency modulation in a video cassette recorder's (VCR's) video signal recording mode, and by differently setting the frequency characteristics according to the presence of a color signal in the video signal to record.

While this invention has been particularly shown and described with reference to preferred embodiments thereof, it will be understood by those skilled in the art that various changes in form and details may be made therein without departing from the spirit and scope of the invention as defined by the appended claims.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
a decision unit detecting when a video signal includes a color signal, detecting when said color signal has predetermined characteristics, generating a color killer control signal when said video signal does not include said color signal;
low pass filter unit receiving said video signal, outputting a low frequency band signal, said low frequency band signal being lower than a first cut off frequency by setting said first cut off frequency higher than at least a color signal sub-carrier frequency when said color killer control signal is generated, said low frequency band signal being lower than a second cut off frequency by setting said second cut off frequency lower than a color signal sub-carrier frequency when said color killer control signal is not generated;
a frequency modulation unit frequency-modulating said band signal output from said low pass filter unit; and
a recording equalizing unit receiving said frequency modulated signal, peaking a predetermined luminance signal frequency band cutting off the frequency down-converted color signal frequency band when said color killer control signal is not generated, and not cutting off the frequency down-converted color signal frequency band when said color killer control signal is generated.

2. The apparatus of claim 1, said apparatus recording a high resolution video signal.

3. The apparatus of claim 1, said decision unit corresponding to a color killer decision unit, said color killer decision unit generating said color killer control signal when said color signal has said predetermined characteristics.

4. The apparatus of claim 3, said color signal having said predetermined characteristics when phase of said color signal is distorted.

5. The apparatus of claim 4, said color signal having said predetermined characteristics when a noise level of said color signal is above a predetermined threshold.

6. The apparatus of claim 3, said color signal having said predetermined characteristics when a noise level of said color signal is above a predetermined threshold.

7. The apparatus of claim 6, said recording equalizing unit receiving said frequency modulated signal from said frequency modulation unit.

8. The apparatus of claim 1, said recording equalizing unit receiving said frequency modulated signal from said frequency modulation unit.

9. The apparatus of claim 1, a frequency deviation of said frequency modulation unit being set at 3.4+α megahertz to 4.4+α megahertz for a National Television Standards Committee signal, α being a positive number.

10. The apparatus of claim 9, a frequency deviation of said frequency modulation unit being set at 3.8+α megahertz to 4.8+α megahertz for a phase alternation line signal, α being a positive number.

11. The apparatus of claim 10, a frequency deviation of said frequency modulation unit being set at 3.8+α megahertz to 4.8+α megahertz for a sequential couleur avec memoire signal, α being a positive number.

12. The apparatus of claim 1, a frequency deviation of said frequency modulation unit being set at 3.8+α megahertz to 4.8+α megahertz for a phase alternation line signal, α being a positive number.

13. The apparatus of claim 1, a frequency deviation of said frequency modulation unit being set at 3.8+α megahertz to 4.8+α megahertz for a sequential couleur avec memoire signal, α being a positive number.

14. An apparatus, comprising:
a key input unit selecting one mode from among a high resolution recording mode and a normal recording mode;
a low pass filter separating a luminance signal from a video signal;
a frequency modulation unit receiving said separated luminance signal from said low pass filter, modulating signal frequency by setting a first frequency deviation when said normal recording mode is selected, modulating signal frequency by setting a second frequency deviation when said high resolution recording mode is selected;
a recording equalizing unit receiving said frequency modulated signal from said frequency modulation unit, setting a first peaking frequency when said high resolution recording mode is selected, setting a second peaking frequency when said normal recording mode is selected, said first peaking frequency being higher than said second peaking frequency.

15. The apparatus of claim 14, said apparatus recording a high resolution video signal.

16. The apparatus of claim 14, said first peaking frequency being higher than said second peaking frequency to compensate for frequency characteristics of said luminance signal.

17. The apparatus of claim 14, said first frequency deviation corresponding to 3.4 megahertz to 4.4 megahertz for a National Televions Standards Committee signal, corresponding to 3.8 megahertz to 4.8 megahertz for a phase alternation line signal, and corresponding to 3.8 megahertz to 4.8 megahertz for a sequential couleur avec memoire signal.

18. The apparatus of claim 17, said second frequency deviation corresponding to 3.4+α megahertz to 4.4+α megahertz for a National Televions Standards Committee signal, corresponding to 3.8+α megahertz to 4.8+α megahertz for a phase alternation line signal, and corresponding to 3.8+α megahertz to 4.8+α megahertz for a sequential couleur avec memoire signal, α being a positive number.

19. The apparatus of claim 14, said second frequency deviation corresponding to 3.4+α megahertz to 4.4+α megahertz for a National Televions Standards Committee signal, corresponding to 3.8+α megahertz to 4.8+α megahertz for a phase alternation line signal, and corresponding to 3.8+α megahertz to 4.8+α megahertz for a sequential couleur avec memoire signal, α being a positive number.

20. The apparatus of claim 14, said recording equalizing unit comprising:
a first equalizing device emphasizing a luminance signal with said first peaking frequency corresponding to said high resolution recording mode;
a second equalizing device emphasizing a luminance signal with said second peaking frequency corresponding to said normal recording mode;
a switching unit receiving output signals from said first and second equalizing devices, selecting a signal from among said output signals in dependence upon said selected mode, outputting said selected signal.

21. The apparatus of claim 14, said apparatus recording a high resolution video signal, said first peaking frequency being higher than said second peaking frequency to compensate for frequency characteristics of said luminance signal, said first frequency deviation corresponding to 3.4 megahertz to 4.4 megahertz for a National Televions Standards Committee signal, corresponding to 3.8 megahertz to 4.8 megahertz for a phase alternation line signal, and corresponding to 3.8 megahertz to 4.8 megahertz for a sequential couleur avec memoire signal.

22. The apparatus of claim 21, said second frequency deviation corresponding to 3.4+α megahertz to 4.4+α megahertz for a National Televions Standards Committee signal, corresponding to 3.8+α megahertz to 4.8+α megahertz for a phase alternation line signal, and corresponding to 3.8+α megahertz to 4.8+α megahertz for a sequential couleur avec memoire signal, α being a positive number.

23. An apparatus, comprising:
a key input unit selecting one reproducing mode from among a high resolution reproducing mode and a normal reproducing mode, said selected reproducing mode corresponding to a recording mode;
a pre-amplifier amplifying a video signal;
a color killer decision unit generating a color killer control signal when no color signal is present in said video signal output from said pre-amplifier;
a reproducing equalizing unit receiving said video signal output from said pre-amplifier, peaking a predetermined frequency signal cutting-off a frequency down-converted color signal frequency band when said color killer control signal is not generated, and not cutting-off a frequency down-converted color signal frequency band when said color killer control signal is generated;
a demodulation unit receiving a first signal output from said reproducing equalizing unit, frequency-demodulating said first signal to a carrier-wave frequency corresponding to said selected reproducing mode; and
a low-pass filter unit receiving said frequency modulated-demodulated signal from said demodulation unit, passing a low band frequency signal lower than a first cut-off frequency by setting said first cut-off frequency higher than at least a color signal sub-carrier frequency when said color killer control signal is generated, passing a low band frequency signal lower than a second cut-off frequency by setting said second cut-off frequency lower than a color signal sub-carrier frequency when said color killer control signal is not generated.

24. The apparatus of claim 23, said apparatus recording and reproducing said video signal.

25. The apparatus of claim 23, said pre-amplifier amplifying said video signal detected by a video head.

26. The apparatus of claim 23, said color killer decision unit generating said color killer control signal when said color killer decision unit detects that no color signal is present in said video signal.

27. The apparatus of claim 23, said color killer decision unit generating said color killer control signal when no color signal is present in said video signal output from said pre-amplifier.

28. The apparatus of claim 23, said demodulation unit frequency modulation-demodulates in a frequency deviation of 3.4+α megahertz to 4.4+α megahertz for a National Television Standards Committee signal when said selected reproducing mode corresponds to said high resolution reproducing mode, α being a positive number.

29. The apparatus of claim 23, said demodulation unit frequency modulation-demodulates in a frequency deviation of 3.4+α megahertz to 4.4+α megahertz for a phase alternation line signal when said selected reproducing mode corresponds to said high resolution reproducing mode, α being a positive number.

30. The apparatus of claim 23, said demodulation unit frequency modulation-demodulates in a frequency deviation of 3.4+α megahertz to 4.4+α megahertz for a a sequential couleur avec memoire signal when said selected reproducing mode corresponds to said high resolution reproducing mode, a being a positive number.

31. The apparatus of claim 23, said predetermined frequency of said reproducing equalizing unit being set higher when said selected reproducing mode corresponds to said high resolution reproducing mode than said predetermined frequency of said normal reproducing mode.

32. The apparatus of claim 23, said apparatus reproducing a high resolution video signal, said color killer decision unit generating said color killer control signal when said color killer decision unit detects that no color signal is present in said video signal from said pre-amplifier.

33. The apparatus of claim 32, said color killer decision unit generating said color killer control signal when a color signal having predetermined characteristics is present in said video signal.

34. The apparatus of claim 33, said color signal having said predetermined characteristics when phase of said color signal is distorted.

35. The apparatus of claim 34, said color signal having said predetermined characteristics when a noise level of said color signal is above a predetermined threshold.

36. The apparatus of claim 35, said demodulation unit frequency modulation-demodulates in a frequency deviation of 3.4+α megahertz to 4.4+α megahertz for a National Television Standards Committee signal when said selected reproducing mode corresponds to said high resolution reproducing mode, α being a positive number.

37. The apparatus of claim 36, said demodulation unit frequency modulation-demodulates in a frequency deviation of 3.4+α megahertz to 4.4+α megahertz for a phase alternation line signal when said selected reproducing mode corresponds to said high resolution reproducing mode.

38. The apparatus of claim 37, said demodulation unit frequency modulation-demodulates in a frequency deviation of 3.4+α megahertz to 4.4+α megahertz for a a sequential couleur avec memoire signal when said selected reproducing mode corresponds to said high resolution reproducing mode.

39. The apparatus of claim 38, said predetermined frequency of said reproducing equalizing unit being set higher when said selected reproducing mode corresponds to said high resolution reproducing mode than said predetermined frequency of said normal reproducing mode.

40. The apparatus of claim 38, said predetermined frequency of said reproducing equalizing unit being set at a first setting when said selected reproducing mode corresponds to said high resolution reproducing mode, said predetermined frequency of said reproducing equalizing unit being set at a second setting when said selected reproducing mode corresponds to said normal reproducing mode, said first setting being higher than said second setting.

41. The apparatus of claim 1, further comprising:
a key input unit selecting one mode from among a high resolution recording mode and a normal recording mode; and
said frequency modulation unit receiving said band signal from said low pass filter, modulating a signal frequency of said band signal by setting a first frequency deviation when a normal recording mode is selected, modulating a signal frequency of said band signal by setting a second frequency deviation when a high resolution recording mode is selected.

42. The apparatus of claim 41, said recording equalizing unit receiving said frequency modulated signal from said frequency modulation unit, setting a first peaking frequency when said high resolution recording mode is selected, setting a second peaking frequency when said normal recording mode is selected when color killer control signal is not generated, said first peaking frequency being higher than said second peaking frequency.

43. The apparatus of claim 14, further comprising:
a decision unit detecting when the video signal includes a color signal, detecting when said color signal has predetermined characteristics, generating a color killer control signal when said video signal does not include said color signal; and
said a low pass filter unit receiving said video signal, outputting a low frequency band signal as said separated luminance signal, said low frequency band signal being lower than a first cut off frequency by setting said first cut off frequency higher than at least a color signal sub-carrier frequency when said color killer control signal is generated, said low frequency band signal being lower than a second cut off frequency by setting said second cut off frequency lower than a color signal sub-carrier frequency when said color killer control signal is not generated.

* * * * *